United States Patent
Kwon et al.

(10) Patent No.: US 8,669,686 B2
(45) Date of Patent: Mar. 11, 2014

(54) ROTOR AND METHOD OF MANUFACTURING THE ROTOR

(75) Inventors: Hyuk Soo Kwon, Anjo (JP); Motoki Watanabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 405 days.

(21) Appl. No.: 13/145,864

(22) PCT Filed: Oct. 9, 2009

(86) PCT No.: PCT/JP2009/067633
§ 371 (c)(1),
(2), (4) Date: Jul. 22, 2011

(87) PCT Pub. No.: WO2011/042984
PCT Pub. Date: Apr. 14, 2011

(65) Prior Publication Data
US 2012/0019097 A1 Jan. 26, 2012

(51) Int. Cl.
*H02K 1/28* (2006.01)
(52) U.S. Cl.
USPC .................................... 310/216.116; 310/136
(58) Field of Classification Search
USPC ...................... 310/216.004, 216.11, 216.121, 310/216.123, 216.136
See application file for complete search history.

(56) References Cited

U.S. PATENT DOCUMENTS

| | | | | |
|---|---|---|---|---|
| 6,700,256 B2* | 3/2004 | Fukutani et al. | ................. | 310/90 |
| 6,710,477 B2* | 3/2004 | Lau | ................. | 310/43 |
| 2001/0033113 A1* | 10/2001 | Takano | ................. | 310/67 R |
| 2009/0140598 A1* | 6/2009 | Schieweck et al. | ............ | 310/217 |

FOREIGN PATENT DOCUMENTS

| | | | |
|---|---|---|---|
| JP | 54-75004 | A | 6/1979 |
| JP | 57-034747 | A | 2/1982 |
| JP | 59-11745 | A | 1/1984 |
| JP | 05-199695 | A | 8/1993 |
| JP | 09-168258 | A | 6/1997 |
| JP | 10-164802 | A | 6/1998 |
| JP | 10-257723 | A | 9/1998 |
| JP | 2000-116046 | A | 4/2000 |
| JP | 2002-136067 | A | 5/2002 |
| JP | 2006-254662 | A | 9/2006 |
| JP | 2007-124752 | A | 5/2007 |

OTHER PUBLICATIONS

International Search Report dated Dec. 28, 2009 of PCT/JP2009/067633.

* cited by examiner

*Primary Examiner* — Tran Nguyen
(74) *Attorney, Agent, or Firm* — Kenyon & Kenyon LLP

(57) ABSTRACT

A rotor of the invention includes a core made of laminated steel sheets and formed with a rotation-transmitting-member mounting end face (a wall surface of a through hole for shaft) extending over a lamination direction and a rotation transmitting member (a shaft) mounted to the rotation-transmitting-member mounting end face of the core. The core is formed with a welding end face (a wall surface of a through hole for welding) extending over the lamination direction and in a position adjacent to a rotation-transmitting-member mounting end face. A welded trace is formed in the welding end face, extending to the rotation transmitting member and over the lamination direction of the core. The invention can easily achieve size reduction and weight reduction of a rotary machine and manufacture a rotor in the reduced number of working processes.

6 Claims, 7 Drawing Sheets

ROTOR AND METHOD OF MANUFACTURING THE ROTOR

CROSS-REFERENCE TO RELATED APPLICATIONS

This is a 371 national phase application of PCT/JP2009/067633 filed 9 Oct. 2009, the entire contents of which are incorporated herein by reference.

FIELD OF THE INVENTION

The present invention relates to a rotor including a core made of laminated steel plates and a rotation transmitting member for transmitting rotation of the core to the outside or rotation from the outside to the core, and a method of manufacturing the rotor. More particularly, the present invention relates to a technique of reliably fixing the core and the rotation transmitting member.

BACKGROUND OF THE INVENTION

Heretofore, some rotors to be used in a rotary machine are configured such that a core made of an assembly of magnetic steel sheets laminated is fixed to a rotation transmitting member. To appropriately transmit rotation of the rotation transmitting member to the core, such configuration needs reliable fixation between the core and the rotation transmitting member. The rotation transmitting member is for example a shaft for a rotor of an inner-rotor type rotary machine. It is necessary to prevent all of the rotation between the steel sheets constituting the core, the axial rotation between the core and the shaft, and the sliding of the core in the axial direction of the shaft. For preventing the rotation between the steel sheets, for instance, it is well known that the steel sheets are slightly bent (see Patent Literatures 1 and 2).

For preventing the rotation between the core and the shaft, it is known that a key and a key groove, both being engageable with each other, are formed in the core and the shaft respectively. For preventing the sliding of the core in the axial direction of the shaft, further, it is known that plate members are placed in contact with both ends of the laminated steel sheets in the laminating direction and the plate members are bent (swaged) to the shaft to thereby hold and fix the laminated sheets between the plate members. It is also known that a shaft is provided with a flange at one end side in the axial direction to fix the steel sheets assembly (see Patent Literature 1 for example).

Furthermore, another technique is also known in which the steel sheets assembly is fitted on an outer periphery of a core back and fixed to a shaft through this core back (see Patent Literature 2 for example). In this technique, the core back is fixed to the shaft. The core back is formed with a plurality of holes and each sheet is fixed to the core back through the holes by laser welding. Accordingly, this configuration is provided with a space or clearance enough for insertion of a laser head between the core back and the shaft.

CITATION LIST

Patent Literature

Patent Literature 1: JP2007-124752A
Patent Literature 2: JP2002-136067A

SUMMARY OF INVENTION

Technical Problem

However, the aforementioned conventional techniques have the following disadvantages. In any techniques, separate working processes are carried out to fix the steel sheets of the core to each other and to fix the core to the shaft. Thus, the number of working processes is generally large. In this regard, there is a demand for minimizing the number of working processes.

In any techniques, further, both ends of the core in the laminating direction are held by members such as the plate member, the flange, or the core back and fixed to the shaft through those members. Accordingly, a space is necessary to place those members. In Patent Literature 2 mentioned above, the space for laser welding is needed between the core back and the shaft. To achieve further size reduction and weight reduction of the rotary machine, it is desired to minimize the members and the spaces.

The present invention has been made to solve the above problems of the conventional techniques and has a purpose to provide a rotor easily enabling size reduction and weight reduction of a rotary machine and being manufacturable in the minimum number of working processes, and a method of manufacturing the rotor.

Solution to Problem

To achieve the above purpose, one aspect of the invention provides a rotor including a core made of laminated steel sheets and formed with a shaft mounting end face extending over a lamination direction and a shaft mounted to the mounting end face of the core and placed through a rotation center of the core, wherein the core is formed with a through hole for shaft for inserting the shaft therethrough and a through hole for welding, the through holes extending over the lamination direction, the shaft mounting end face is a wall face of the through hole for shaft, the core is formed with a welding end face extending over the lamination direction and in a position adjacent to the shaft mounting end face, and a welded trace is formed in the welding end face over in the lamination direction of the core, the welded trace extending to the shaft.

According to the rotor in the above aspect, the welding end face is formed adjacent to the rotation-transmitting-member mounting end face to which the shaft is mounted in the core. Herein, the adjacent position represents a position in which the core and the shaft are melted together by welding and hardened into integral form. Since the welding end face is formed with the welded trace extending to the shaft, it is found that the core and the shaft are fixed to each other by welding. The welded trace is formed over the lamination direction of the core, so that all the laminated steel sheets constituting the core are fixed to the shaft. Accordingly, the rotor easily enables size reduction and weight reduction of a rotary machine and is manufacturable in the reduced number of working processes.

In the above aspect of the invention, preferably, the through hole for welding is provided around the through hole for shaft, and the welding end face is a wall face of the through hole for welding, on a side close to the through hole for shaft.

With this configuration, through the use of the through hole for welding, the welding is conducted from the welding end face toward the through hole for shaft to melt them to extend to the shaft.

In the above aspect of the invention, more preferably, the through hole for welding has a size of 2 mm or more in a circumferential direction of the core and a size D in a radial direction of the core determined to satisfy a relation of:

$$D \geq L \times \tan 10°$$

where L denotes a lamination thickness of the core.

With this configuration, a beam can be irradiated from one end of the core in the lamination direction up to the other end.

The above aspect of the invention may be configured such that the through hole for welding and the through hole for shaft are formed as a continuous single through hole, the shaft mounting end face is a part of a wall face of the continuous single through hole, and the welding end face is a portion of a wall face of the continuous single through hole, the portion adjoining the shaft mounting end face.

With this configuration, through the use of the through hole, the boundary between the wall surface and the shaft is welded. Thus, both are melted so as to extend to the shaft.

A method of manufacturing a rotor including a core made of laminated steel sheets and formed with a shaft mounting end face extending over a lamination direction and a shaft mounted to the mounting end face of the core and placed through a rotation center of the core, the method comprising the steps of: mounting the shaft to a shaft mounting end face of the core made by laminating a plurality of steel sheets each being formed with a through hole for inserting the shaft therethrough and a through hole for welding, a wall face of the through hole for shaft being the shaft mounting end face and a portion adjacent to the shaft mounting end face being a welding end face; and welding a range from the welding end face to the shaft by irradiating a beam (an electron beam or a laser beam) to the range over the lamination direction of the core.

According to this aspect, the core can be produced by laminating steel sheets to form the shaft mounting end face and the welding end face. Furthermore, the shaft is mounted to the core and then welded from the welding end face. Accordingly, the rotor formed with the welded spot can be easily manufactured.

In the above aspect, preferably, the welding step includes moving a beam irradiating portion in a lamination direction of the core.

With this configuration, welding can be easily conducted over the lamination direction.

Advantageous Effects of Invention

According to the rotor and the manufacturing method thereof in the above aspects of the present invention, it is possible to easily reduce the size and the weight of a rotary machine and manufacture the rotor in the reduced number of working processes.

DETAILED DESCRIPTION

A detailed description of a preferred embodiment of the present invention will now be given referring to the accompanying drawings. In the present embodiment, the invention is applied to a rotor in which a core consisting of laminated steel sheets is fixed to a shaft.

Figure 1:
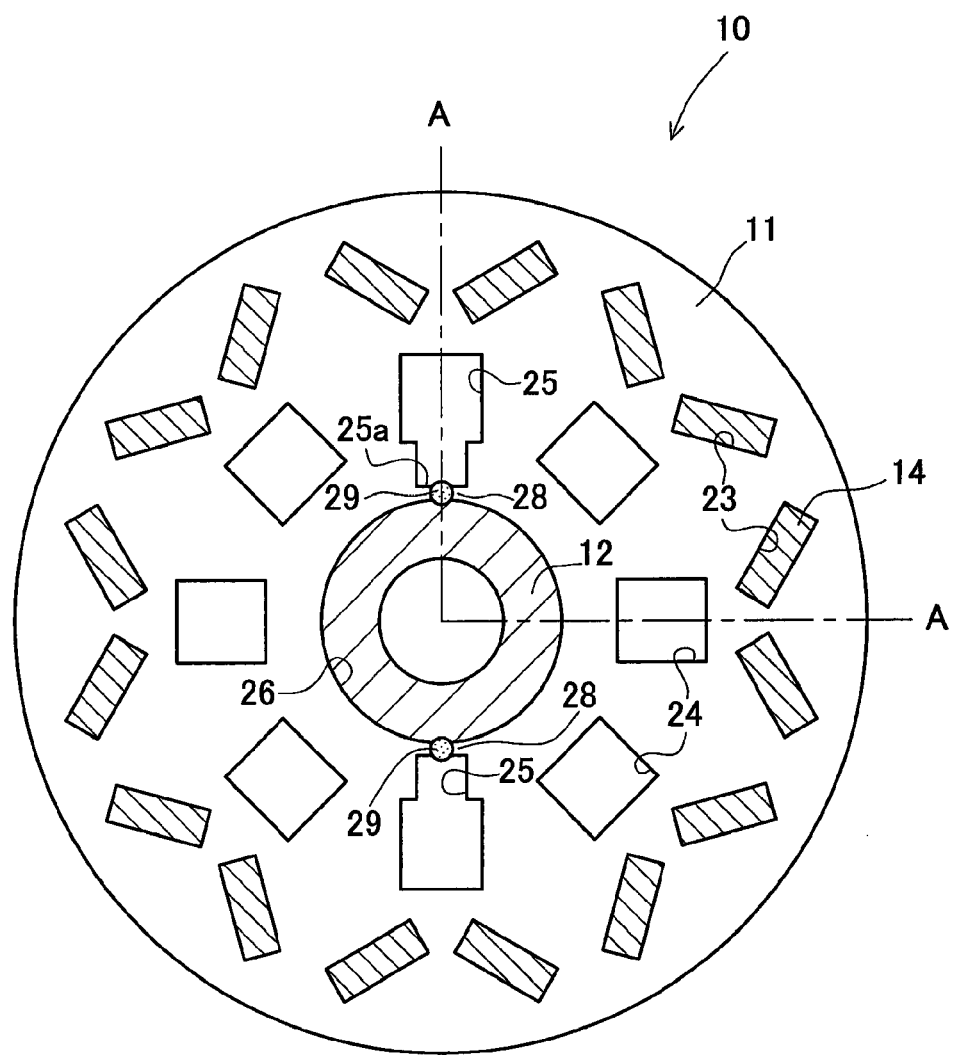
FIG. 1 is a cross-sectional view showing a rotor in an embodiment.
Figure 2:
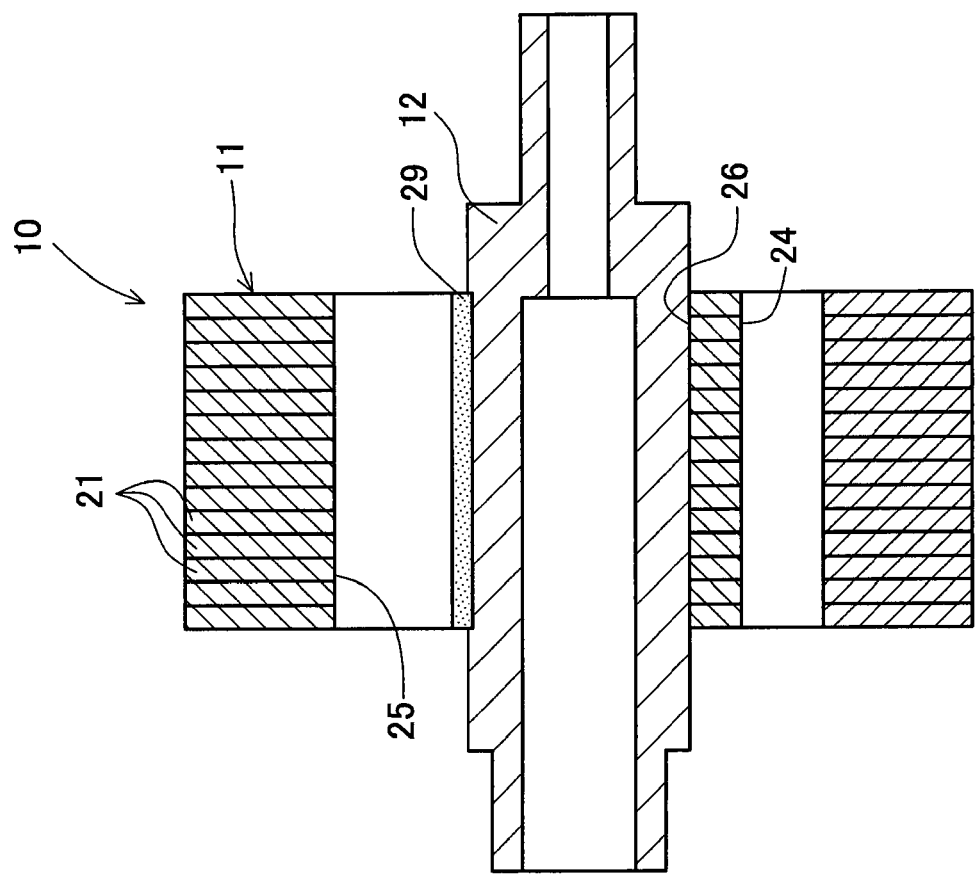
FIG. 2 is a cross-sectional view showing the rotor in the embodiment.

A rotor 10 in this embodiment includes a core 11 and a shaft 12 to which the core 11 is fixed as shown in FIGS. 1 and 2. FIG. 2 is a cross-sectional view taken along a line A-A in FIG. 1. The core 11 of the rotor 10 in this embodiment is made of laminated steel sheets in which permanent magnets 14 are embedded in predetermined positions. This rotor 10 is to be used in a motor of an interior permanent magnet type and inner-rotor type.

The core 11 is formed with several types of through holes 23, 24, 25, and 26 as shown in FIG. 1. In the through holes 23 provided on an outermost circumferential side of those through holes, the permanent magnets 14 are embedded to penetrate through the core 11 in the laminating direction. The through holes 23 are arranged evenly in almost all directions. It is to be noted that the core 11 in the present embodiment is formed with sixteen through holes 23 in total.

Further, a plurality of the through holes 24 are arranged on a more inner side than the through holes 23 in the core 11 as shown in FIG. 1. These through holes 24 are made void to reduce the weight of the core 11. The through holes 25 used for welding are formed in two, upper and lower, positions in the figure. The through holes 25 are somewhat different in shape from the through holes 24. In a rotation center of the core 11, the through hole 26 for shaft is formed. This through hole 26 is designed with such a diameter as to permit a shaft to be just fitted therein. FIGS. 1 and 2 show a state where the shaft 12 is inserted through the through hole 26.

Each through hole 25 for welding is formed very close to the through hole 26 for shaft as shown in FIG. 1. That is, a wall face 25a of each through hole 25, located close to the through hole 26 for shaft, is formed in a position adjacent to a wall face of the through hole 26 for shaft. In the core 11, a bridge portion 28 is provided between each wall face 25a and the through hole 26 for shaft. Specifically, the bridge portions 28 partition the through holes 25 for welding and the through hole 26 for shaft.

Each bridge portion 28 is formed with a welded trace 29 passing through the bridge portion 28 to extend from the wall face 25a to a part of the shaft 12. This welded trace 29 is linearly formed over the laminating direction of the core 11 as shown in FIG. 2. Specifically, each welded trace 29 is formed in the core 11 to extend throughout its length in the axial direction of the shaft 12. The welded traces 29 are welded marks formed by irradiating an electron beam from the through holes 25 toward the wall faces 25a.

The welded traces 29 represent that, in all the steel sheets constituting the core 11, the bridge portions 28 and a part of the face of the shaft 12 are welded and melted together into an integral structure. Simultaneously, parts of the steel sheets constituting the core 11 are also melted together and made integral with each other through the welded traces 29. This prevents the rotation between the steel sheets of the core 11, the rotation of the core 11 around the shaft 12, and the movement of the core 11 in the axial direction of the shaft 12.

Specifically, the core 11 and the shaft 12 are reliably fixed to each other through the welded traces 29.

In the present embodiment, the shaft 12 corresponds to a rotation transmitting member. The wall face of the through hole 26 for shaft in the core 11 corresponds to a rotation-transmitting-member mounting end face and the wall face 25a of the through hole 25 for welding corresponds to a welding end face, respectively. The welded traces 29 extend across the bridge portions 28. Thus, the through hole 26 for shaft and each wall face 25a are located adjacently on both sides of each bridge portion 28. According to the present embodiment, for fixing the core 1 and the shaft 12, there is no need to place plate members in contact with end portions of the core 11 in the laminating direction or form a key groove in a shaft.

Herein, the through holes 25 for welding are provided in two positions. Alternatively, the through hole(s) 25 may be formed in one position or three or more positions as long as the core 11 and the shaft 12 can be surely fixed to each other. The shape and the arrangement of the through holes 24 are not particularly limited to the above and may be variously modified if only the strength and the balance of the core 11 can be maintained appropriately. In the present embodiment, the through holes 24 and the through holes 25 for welding are eight in combination and in total. In the figure of the present embodiment, the shape of the through holes 25 for welding is shown as the shape of a stepped hole, which is somewhat different from the shape of the through holes 24. Alternatively, the through holes 25 for welding and the through holes 24 may be designed with completely different shapes.

A method of manufacturing the rotor 10 in the present embodiment will be explained below. In this embodiment, the following four processes are performed to manufacture the rotor 10.

(1) Punching process;
(2) Laminating process;
(3) Shaft inserting process; and
(4) Welding process.

Figure 3:
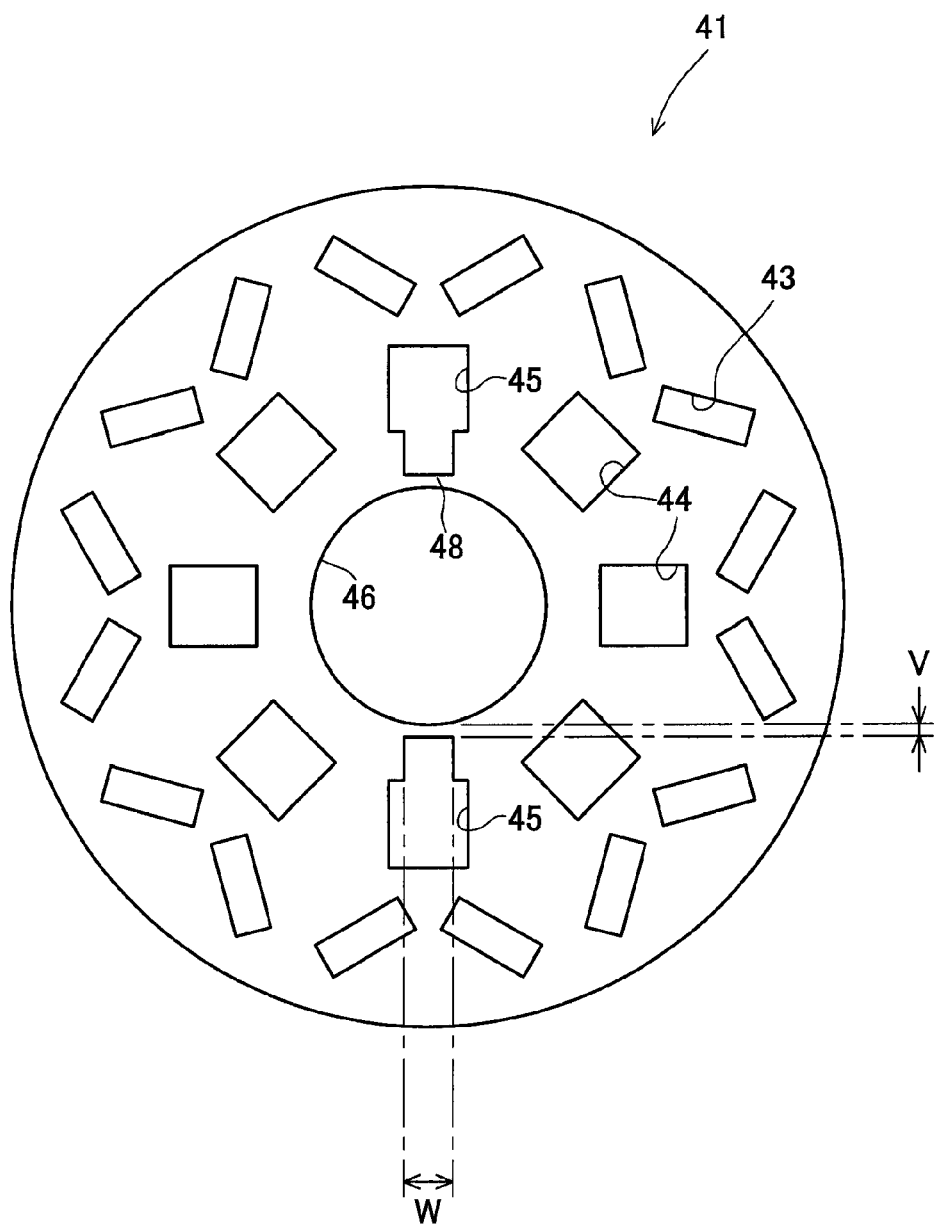
FIG. 3 is an explanatory view showing a yoke in a manufacturing process of the rotor.

Firstly, in the punching process (1), a yoke 41 is punched out of an original sheet as shown in FIG. 3. The yokes 41 having the same, almost circular-disc shape, are produced in the number needed for a core 11. At that time, each yoke 41 is simultaneously formed with through holes 43, 44, 45, and 46 by punching in positions corresponding to the through holes 23, 24, 25, and 26 of the core 11. In this stage, each yoke 41 includes bridges 48, corresponding to the bridge portions 28 of the core 11, between each through hole 45 and the through hole 46 as shown in the figure.

Secondly, in the laminating process (2), the desired number of the yokes 41 for the core 11 are laminated. At that time, the yokes 41 are laminated by aligning the through holes 43, 44, 45, and 46 respectively. Accordingly, the through holes 43 of the yokes 41 overlap one another, forming the through holes 23. Similarly, the through holes 44, 45, and 46 of the yokes 41 overlap to form the through holes 24, 25, and 26 of the core 11 respectively. It is to be noted that the permanent magnets may be embedded in the resultant through holes 23 just after the above process or in a later process.

In the shaft inserting process (3), subsequently, the shaft 12 separately manufactured is inserted through the aligned through holes 46 (the through hole 26 for shaft) of the yokes 41 laminated in the laminating process (2) until the shaft 12 is placed in an appropriate position.

Figure 4:
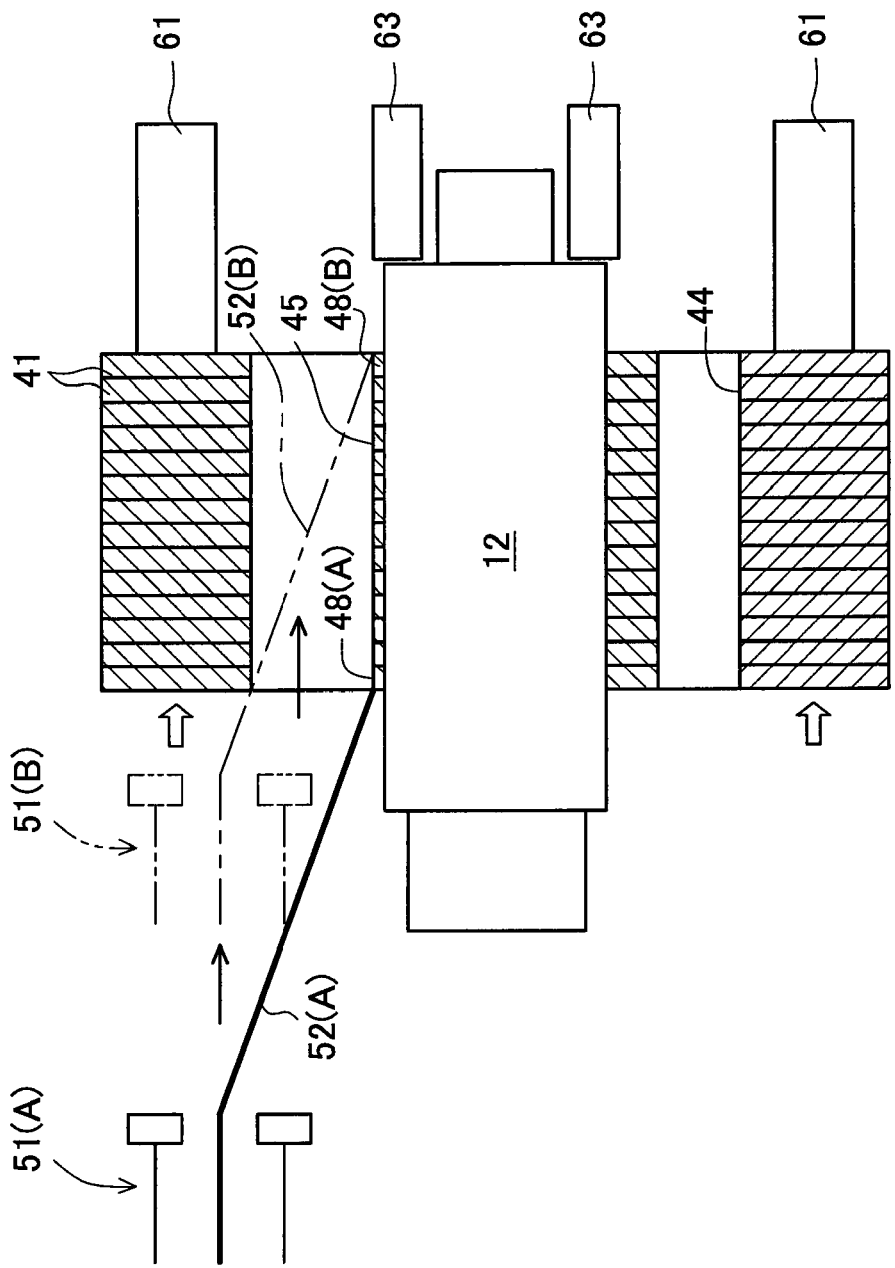
FIG. 4 is an explanatory view showing a welding process.

In the welding process (4), as shown in FIG. 4, electron beam welding is conducted by use of an electron gun 51. In this embodiment, the gun 51 is first placed in an initial position (a position indicated by an alphabet (A) in the figure) so that an electron beam 52 fall on a bridge 48(A) of the yoke 41 located at an end (a left end in the figure) closest to the incident side. Then, the electron beam 52(A) is irradiated. A portion of the bridge 48(A) exposed to the electron beam 52(A) is thus melted. Further, a portion surrounding that melted portion is also melted and a molten area extends to the shaft 12. When this melted area hardens, the yokes 41 are fixed to the shaft 12 through the hardened area.

Further, the electron gun 51 is moved in the axial direction of the shaft 12 from left to right in FIG. 4 while emitting the electron beam 52. Herein, the incident direction of the electron beam 52 is determined within a plane defined by a radial direction of the core 11 and the axial direction of the shaft 12 in the through hole 25 for welding. Accordingly, the electron beam 52 is prevented from falling on any other portions than the bridges 48. When the electron beam 52 reaches an end position (B), the bridges 48 of all the yokes 41 are welded to the outer periphery of the shaft 12. Thus, welding is completed. If the permanent magnets have not been embedded in the prior laminating process (2), furthermore, this embedding work is performed after the welding. The rotor 10 is thus manufactured.

In this welding process (4), the bridge 48 of each yoke 41 is welded to the shaft 12, forming the welded trace 29 shown in FIG. 1. Consequently, the yokes 41 of the core 11 are fixed to the shaft 12 respectively. This fixing can be achieved simply by the welding process, whereby preventing the rotation between the yokes 41, the axial rotation between the core 11 and the shaft 12, and sliding of the core 11 in the axial direction of the shaft 12.

This welding process (4) is preferably performed by pressing some parts as shown in FIG. 4 in order to appropriately maintain the laminated relation of the yokes 41. For instance, it is preferable that jigs 61 are placed at a right end of the core 11 in the figure and a leftmost one of the yokes 41 is pressed from left to right in the figure as indicated by hollow arrows. In this figure, furthermore, jigs 63 are also placed in contact with the shaft 12 to prevent displacement thereof. Alternatively, the core 11 may be entirely held or sandwiched in the lamination direction against displacement.

Figure 5:
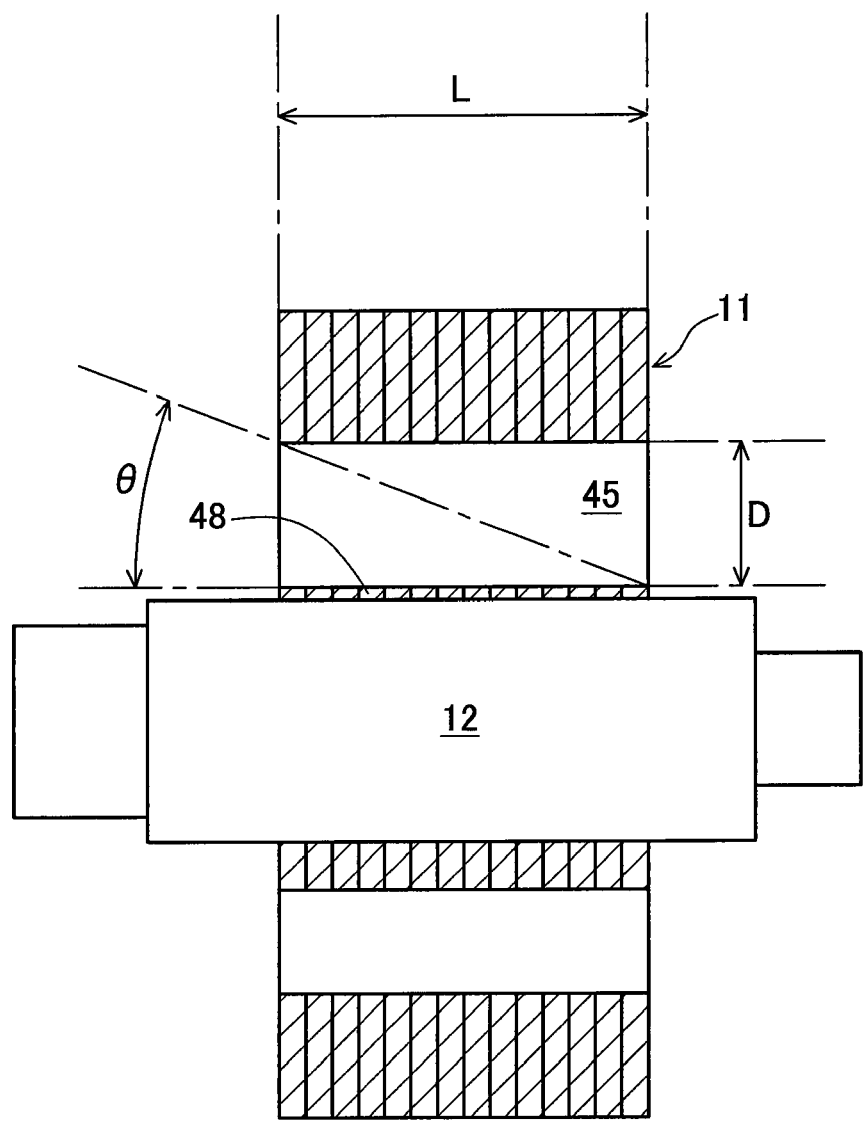
FIG. 5 is an explanatory view showing the size of a through hole.

In this welding process (4), there needs some space above the bridge 48 in the figure to direct the electron beam 52 to a farthest side (a right end in FIG. 4) from the electron gun 51. Especially, for appropriately welding a portion exposed to the electron beam 52, it is essential to set an incident angle θ to a welding surface at least 10° or more as shown in FIG. 5. Accordingly, the necessary space above the bridge 48, i.e., the size D of each through hole 45 in a radial direction of the core 11 is preferably determined in a range defined by the following expression:

$$D \geq L \times \tan 10°$$

where L denotes a lamination thickness L of the core 11.

The above incident angle θ is more preferably set to 15° or more. In this case, the size D of the through hole 45 in the radial direction of the core 11 is determined in a range defined by the following expression:

$$D \geq L \times \tan 15°$$

Further, width W (the size of the core 11 in a circumferential direction, see FIG. 3) of the through hole 45 has to be at least equal to or larger than a beam diameter of the electron beam 52. In a range of the through hole 45 for passing the electron beam 52, the width W is preferably 2 mm or more, for example. The range for passing the electron beam 52 is a range from a side of the through hole 45 defining the bridge 48 to a distance corresponding to a minimum value of the size D determined by any of the above expressions.

Width V of the bridge 48 (the distance between the through hole 45 and the through hole 46, see FIG. 3) is a width of the bridge portion 28 in the core 11. That is, the width V is determined so that a melted area by the electron beam 52 reaches the shaft 12. It is appropriately smaller than the depth of a portion to be welded, for example, within a range of 1 mm to 5 mm. Therefore, the adjacent position of the welding end face and the rotation-transmitting-member mounting end face represent that the distance therebetween is smaller than the welding depth during welding in the case where the through holes are separated.

In this welding process (4), naturally, the direction of moving the electron gun 51 may be reversed ((B)→(A)) from the above mentioned. Instead of moving the electron gun 51, the electron beam 52 may be swung to change an irradiating direction. This can also achieve appropriate welding. Another alternative is to fix the electron gun 51 and move a target such as the core 11 and others. The welding in this embodiment is conducted from one end side to over the range in the axial direction of the shaft 12. Alternatively, welding may be performed from both end sides to halves respectively. In this case, the term L in the expression for D is replaced with L/2. Instead of the electron beam welding, laser welding may be adopted.

Other examples of the present embodiment are shown in FIGS. 6 to 9. In those examples, the welding method in the welding process (4) adopts fillet welding instead of the aforementioned lap welding. Specifically, instead of the bridges 48 between the through holes 25 for welding and the through hole 26 for shaft, a through hole for passing the shaft 12 therethrough is designed so that a part of the through hole is expanded in a radial direction of the core. Through a clearance between the expanded through hole (a through hole 64 in FIG. 6 and a through hole 74 in FIG. 8) and a shaft 12, an electron beam is irradiated to a contact area between the wall face of the through hole and the shaft 12, thereby welding the shaft 12 and the core. That is, the through hole for welding and the through hole for shaft is configured as the continuous single through hole 64 or 74.

In those cases, the contact area of the wall face of the through hole 64 or 74 with respect to the shaft 12 corresponds to the rotation-transmitting-member mounting end face. A portion of the wall face of the through hole 64 or 74, in a range adjoining the contact area with the shaft 12, corresponds to the welding end face. These are locations where the shaft 12 and the core are melted together by irradiation of the electron beam to the boundary therebetween. Accordingly, adjacent positions of the welding end face and the rotation-transmitting-member mounting end face represent the range in which they are meltable by irradiation of the electron beam in the case where the through holes are continuous.

In those figures, the through holes for embedding the permanent magnets (corresponding to the through holes 23 in FIG. 1) are omitted. Further, for weight reduction, additional through holes (corresponding to the through holes 24 in FIG. 1) may be formed, but are omitted.

Figure 6:
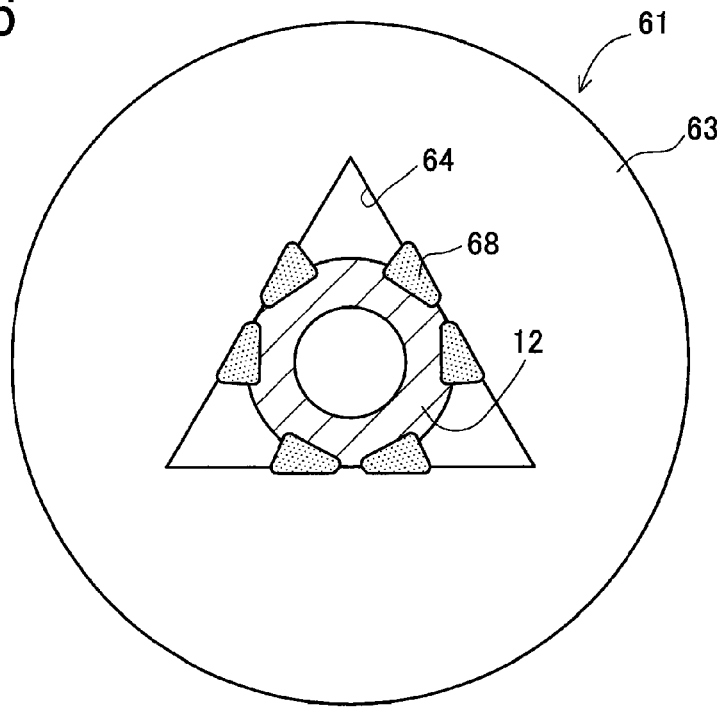
FIG. 6 is a cross-sectional view showing a structure of a rotor in another example.
Figure 7:
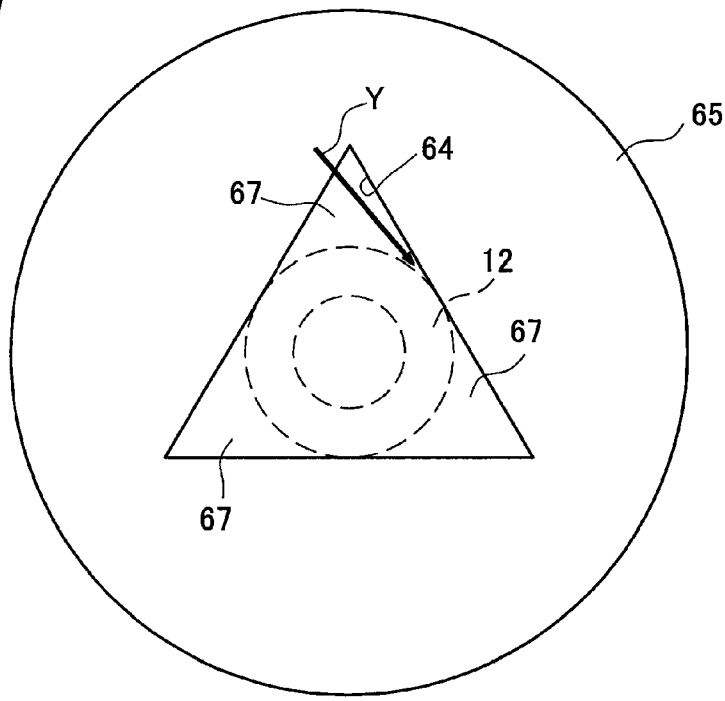
FIG. 7 is an explanatory view showing the shape of a yoke in the example shown in FIG. 6.

A rotor 61 shown in FIG. 6 includes a core 63 and a shaft 12. The core 63 is formed with a regular triangular through hole 64 having such a size that the shaft 12 is inscribed in the through hole 64. The shaft 12 is inserted and fixed in the through hole 64. Thus the rotor 61 is completed. This core 63 consists of laminated yokes 65 each made of a magnetic steel sheet having a shape as shown in FIG. 7. The shaft 12 is inserted in the through hole 64 of the laminated yokes 65 as indicated by a broken line in FIG. 7.

Specifically, the through hole 64 in this example corresponds to a combination of the through hole 46 and the through holes 45 in FIG. 3. There is no area corresponding to the bridges 48. Three portions of the wall face of the through hole 64, at which the yokes 65 and the shaft 12 are in contact with each other, correspond to the rotation-transmitting-member mounting end faces. Further, other portions of the wall face of the through hole 64 slightly apart from the shaft 12, continuous from both sides of each rotation-transmitting-member mounting end face and in a range where the shaft 12 and the core 63 are meltable together by welding, correspond to the welding end faces. Consequently, in those examples, the end faces are placed adjacently.

In this example, the wall face of the through hole 64 and the outer periphery of the shaft 12 contact at three points as shown in FIG. 7. In each of three apexes of the through hole 64, a clearance 67 is left between the yokes 65 and the shaft 12. Therefore, through the use of each clearance 67, an electron beam can be irradiated as indicated by an arrow Y in the figure to a boundary in which the wall face of the through hole 64 and the outer periphery of the shaft 12 are in contact with each other. Thus, at the boundary, the core 63 and the shaft 12 can be welded to each other.

Moreover, the electron gun or the core 63 is moved in the axial direction of the shaft 12, so that the entire core 63 in the lamination direction is welded. As a result, welded traces 68 are formed as shown in FIG. 6, whereby fixing the core 63 to the shaft 12. Six boundaries are present between the wall face of the through hole 64 and the shaft 12. Thus, when all the boundaries are subjected to welding, the rotor 61 formed with the welded traces 68 at six positions as shown in the figure is obtained. It is not always necessary to weld all six positions as long as appropriate fixing can be achieved.

Figure 8:
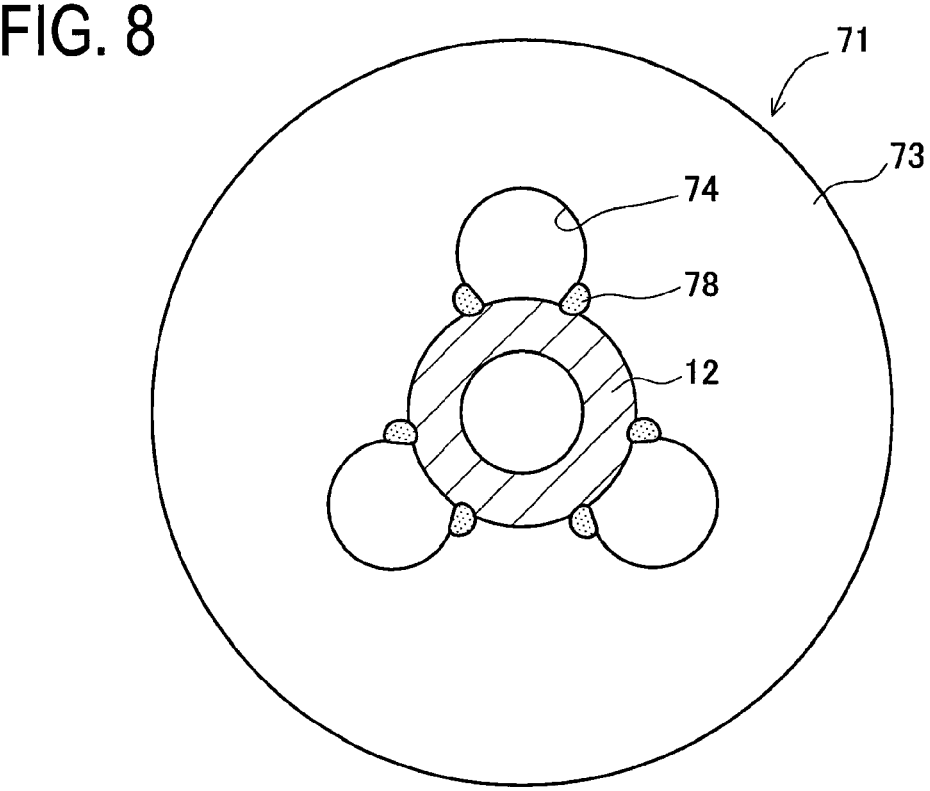
FIG. 8 is a cross-sectional view showing a structure of a rotor in another example.
Figure 9:
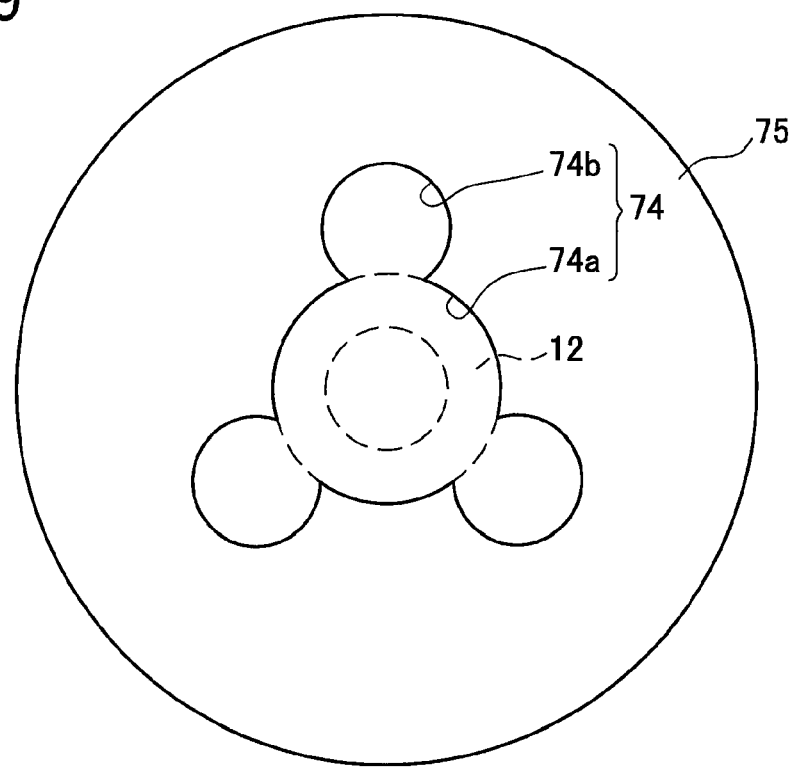
FIG. 9 is an explanatory view showing the shape of a yoke in the example shown in FIG. 8.

A rotor 71 as shown in FIG. 8 is also adopted. A core 73 of this rotor 71 is formed with a through hole 74 and constituted of yokes 75 shown in FIG. 9 in a laminated configuration. This through hole 74 is formed with expanded portions 74b in three positions as well as a circumference portion 74a conforming to the outer periphery of the shaft 12. The shaft 12 is inserted into this through hole 74 as indicated by a broken line in FIG. 9. In this example, the circumference portion 74a corresponds to the rotation-transmitting-member mounting end face and a wall face of each expanded portion 74b, within a range adjoining the outer circumference portion 74a, corresponds to the welding end face. They are also positioned adjacent to each other in this example.

Therefore, an electron beam can be irradiated from each expanded portion 74b toward a boundary where the wall face of the through hole 74 and the outer periphery of the shaft 12 contact with each other. At each boundary, the core 73 and the shaft 12 can be welded to each other. As shown in FIG. 8, the rotor 71 formed with welded traces 78 is obtained.

According to the present embodiment explained in detail above, the core 11 is partly formed with the through holes 25 for welding adjacent to the through hole 26 for shaft in which the shaft 12 is inserted. Since the welded traces 29 are formed extending from the through holes 25 for welding to the shaft 12, all the yokes 41 constituting the core 11 and the shaft 12 are reliably fixed to each other. By welding, each yoke 41 is fixed in all directions. Thus, no additional process for fixing is needed. Further, conventional plate members holding both ends of the core 11 in the lamination direction, spaces for bending, and the like are not necessary. Consequently, a rotor easily enables size reduction and weight reduction of a rotary machine and is manufacturable in the minimum number of working processes.

The above embodiments are mere examples and do not limit the present invention. The invention may be embodied in other specific forms without departing from the essential characteristics thereof.

For instance, the outer shape of the shaft is not limited to cylindrical but may be designed in polygonal prism, spline, serration, etc. Further, a key and a key groove may be added in the shaft and the core for engagement therebetween. A flange may be provided in the shaft to receive one side of the core in the lamination direction. The shaft may be not only an integral form but also a separate form.

For instance, the steel plates of the core may be fixed in advance by bending, welding, adhering, resin molding, or the like. Further, the core may be made of a plurality of split core members separated in a circumferential direction. The invention may be applied not only to the permanent magnet implantable (IPM) type motor but also an SPM type motor with magnets arranged in a rotor surface.

REFERENCE SIGNS LIST 10, 61, 71 Rotor
11, 63, 73 Core
12 Shaft
25 Through hole for welding
26 Through hole for shaft
29 Welded trace
64, 74 Through hole

The invention claimed is:

1. A rotor including a core made of laminated steel sheets and formed with a shaft mounting end face extending over a lamination direction and a shaft mounted to the mounting end face of the core, and placed through a rotation center of the core, wherein
the core is formed with a through hole for shaft for inserting the shaft therethrough and a through hole for welding, the through holes extending over the lamination direction,
the shaft mounting end face is a wall face of the through hole for shaft,
the core is formed with a welding end face extending over the lamination direction and in a position adjacent to the shaft mounting end face, and
a welded trace is formed in the welding end face over in the lamination direction of the core, the welded trace extending to the shaft.

2. The rotor according to claim 1, wherein
the through hole for welding is provided around the through hole for shaft, and
the welding end face is a wall face of the through hole for welding, on a side close to the through hole for shaft.

3. The rotor according to claim 2, wherein
the through hole for welding has a size of 2 mm or more in a circumferential direction of the core and a size D in a radial direction of the core determined to satisfy a relation of:

$$D \geq L \times \tan 10°$$

where L denotes a lamination thickness of the core.

4. The rotor according to claim 1, wherein
the through hole for welding and the through hole for shaft are formed as a continuous single through hole,
the shaft mounting end face is a part of a wall face of the continuous single through hole, and
the welding end face is a portion of a wall face of the continuous single through hole, the portion adjoining the shaft mounting end face.

5. A method of manufacturing a rotor including a core made of laminated steel sheets and formed with a shaft mounting end face extending over a lamination direction and a shaft mounted to the mounting end face of the core, and placed through a rotation center of the core, the method comprising the steps of:
mounting the shaft to shaft mounting end face of the core made by laminating a plurality of steel sheets each being formed with a through hole for inserting the shaft therethrough and a through hole for welding, a wall face of the through hole for shaft being the shaft mounting end face and a portion adjacent to the shaft mounting end face being a welding end face; and
welding a range from the welding end face to the shaft by irradiating a beam to the range over the lamination direction of the core.

6. The rotor according to claim 5, wherein
the welding step includes moving a beam irradiating portion in a lamination direction of the core.

* * * * *